(12) United States Patent
Marica (10) Patent No.: US 8,714,193 B2
(45) Date of Patent: May 6, 2014

(54) POPPET VALVE WITH INTEGRATED DAMPENER

(75) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 162 days.

(21) Appl. No.: 13/183,299

(22) Filed: Jul. 14, 2011

(65) Prior Publication Data

US 2013/0015385 A1    Jan. 17, 2013

(51) Int. Cl.
*F16K 21/04* (2006.01)

(52) U.S. Cl.
USPC .................... 137/533.21; 137/528

(58) Field of Classification Search
USPC ............. 137/511, 528, 533.21, 535; 417/559
See application file for complete search history.

(56) References Cited

U.S. PATENT DOCUMENTS

| | | | |
|---|---|---|---|
| 2,163,472 A * | 6/1939 | Shimer | 137/516.29 |
| 3,066,700 A | 12/1962 | Mercier | |
| 4,074,612 A | 2/1978 | Miller | |
| 4,228,820 A * | 10/1980 | Deminski | 137/514.3 |
| 6,328,542 B1 | 12/2001 | Serafin et al. | |
| 7,168,440 B1 * | 1/2007 | Blume | 137/15.18 |
| 7,726,335 B2 * | 6/2010 | Doble | 137/542 |
| 8,033,917 B2 * | 10/2011 | Prill et al. | 464/18 |
| 2002/0012595 A1 | 1/2002 | Kouno et al. | |
| 2004/0234404 A1 * | 11/2004 | Vicars | 417/571 |
| 2006/0202150 A1 * | 9/2006 | Johnson | 251/336 |
| 2007/0267068 A1 * | 11/2007 | Daigre | 137/511 |

OTHER PUBLICATIONS

PCT/US2012/042660 International Search Report and Written Opinion Dated Jan. 16, 2013 (17 p.).

* cited by examiner

*Primary Examiner* — John K Fristoe, Jr.
*Assistant Examiner* — Umashankar Venkatesan
(74) *Attorney, Agent, or Firm* — Conley Rose, P.C.

(57) ABSTRACT

A poppet valve with an integrated dampener is disclosed. In some embodiments, the valve includes a poppet guide with a stem and a hollow poppet is disclosed. The hollow poppet receives the poppet guide stem therein, thereby defining an internal cavity. The poppet is movable relative to the poppet guide to adjust the volume of the internal cavity. The poppet is also moveable relative to a valve seat between a seated position and an unseated position. The poppet may include a body with a seal groove and an elastic seal disposed within the seal groove. The seal is configured to engage the valve seat prior to the poppet body when the poppet moves toward the seated position. The valve may include a poppet guide pivot system that enables pivoting of the poppet guide and the poppet relative to an axial centerline of the valve.

24 Claims, 5 Drawing Sheets

POPPET VALVE WITH INTEGRATED DAMPENER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates generally to systems and methods for reducing the creation of pulsations in a fluid passing through a valve.

To form an oil or gas well, a bottom hole assembly (BHA), including a drill bit, is coupled to a length of drill pipe to form a drill string. The drill string is then inserted downhole, where drilling commences. During drilling, drilling fluid, or "mud," is circulated down through the drill string to lubricate and cool the drill bit as well as to provide a vehicle for removal of drill cuttings from the borehole. After exiting the bit, the drilling fluid returns to the surface through the annulus formed between the drill string and the surrounding borehole wall.

Instrumentation for taking various downhole measurements and communication devices are commonly mounted within the drill string. Many such instrumentation and communication devices operate by sending and receiving pressure pulses through the annular column of drilling fluid maintained in the borehole.

Mud pumps are commonly used to deliver the drilling fluid to the drill string during drilling operations. Many conventional mud pumps are reciprocating pumps, having one or more piston-cylinder assemblies driven by a crankshaft and hydraulically coupled between a suction manifold and a discharge manifold. Each piston-cylinder assembly has a piston housed within a cylinder. A suction valve positioned between the cylinder and the suction manifold is operable to control the flow of drilling fluid from the suction manifold into the cylinder. Likewise, a discharge valve positioned between the cylinder and the discharge manifold is operable to control the flow of drilling fluid from the cylinder to the discharge manifold.

During operation of the mud pump, the piston is driven to reciprocate within the cylinder. As the piston moves to expand the volume within the cylinder, the discharge valve is closed, and drilling fluid is drawn from the suction manifold through the suction valve into the cylinder. After the piston reverses direction, the volume within the cylinder decreases, the pressure of drilling fluid contained with the cylinder increases, the suction valve closes, and the now-pressurized drilling fluid is exhausted from the cylinder through the discharge valve into the discharge manifold. While the mud pump is operational, this cycle repeats, often at a high cyclic rate, and pressurized drilling fluid is continuously fed to the drill string at a substantially constant rate.

Many conventional suction and discharge valves are poppet valves, each such valve having a poppet that is movable relative to a valve seat between a seated position, wherein the poppet engages the valve seat to prevent fluid flow through the valve, and an unseated position, wherein the poppet is disengaged from the valve seat and fluid may pass through the valve. When moving between the seated and unseated positions, it is common for the poppet to shiver. As used herein, the expression "shiver" refers to the unstable movement of the poppet caused at least in part by forces exerted on the poppet from fluid passing around the poppet through the valve.

Shivering creates pulsations in the drilling fluid that may disturb the downhole communication devices and instrumentation by degrading the accuracy of measurements taken by the instrumentation and hampering communications between downhole devices and control systems at the surface. Over time, the pulsations may also cause fatigue damage to the drill string pipe and other downhole components. Moreover, when the poppet is proximate the valve seat, shivering results in repeated contact between the poppet and the valve seat. Over time, repeated impact of the poppet against the valve seat causes wear to each component that shortens their service life.

Accordingly, there is a need for a poppet valve that is configured to reduce, or eliminate, shivering.

SUMMARY

A poppet valve with an integrated dampener is disclosed. In some embodiments, the poppet valve, or valve assembly, includes a poppet guide and a hollow poppet. The poppet guide has a stem. The poppet guide stem is received within the poppet, thereby defining an internal cavity. The poppet is moveable relative to the poppet guide to adjust the volume of the internal cavity.

In some embodiments, the valve includes a poppet, a poppet guide, and a poppet guide pivot system. The poppet guide pivot system engages the poppet guide and has an axial centerline. The poppet guide pivot system enables pivoting to the poppet guide about the axial centerline. The poppet receives an end of the poppet guide therein and is pivotable with the poppet guide.

In some embodiments, the valve has a poppet for engagement with a valve seat. The poppet is moveable relative to the valve seat between a seated position, wherein the valve poppet engages the valve seat, and an unseated position, wherein the valve poppet is disengaged from the valve seat. The poppet includes a poppet body having an outer surface with a seal groove formed therein and an elastic seal disposed within the seal groove. The seal engages the valve seat prior to the poppet body when the poppet moves toward the seated position.

Thus, embodiments described herein comprise a combination of features and characteristics intended to address various shortcomings associated with conventional poppet valves. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

The following description is directed to exemplary embodiments of a poppet valve with an integrated dampener. The embodiments disclosed should not be interpreted, or otherwise used, as limiting the scope of the disclosure, including the claims. One skilled in the art will understand that the following description has broad application, and that the discussion is meant only to be exemplary of the described embodiments, and not intended to suggest that the scope of the disclosure, including the claims, is limited only to those embodiments.

Certain terms are used throughout the following description and the claims to refer to particular features or components. As one skilled in the art will appreciate, different persons may refer to the same feature or component by different names. This document does not intend to distinguish between components or features that differ in name but not function. Moreover, the drawing figures are not necessarily to scale. Certain features and components described herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, the connection between the first device and the second device may be through a direct connection, or through an indirect connection via other intermediate devices and connections. Further, the terms "axial" and "axially" generally mean along or parallel to a central or longitudinal axis. The terms "radial" and "radially" generally mean perpendicular to the central or longitudinal axis, while the terms "azimuth" or "azimuthally" generally mean perpendicular to the central or longitudinal axis and a radial axis normal to the central or longitudinal axis. As used herein, the terms are consistent with their commonly understood meanings with regard to a cylindrical coordinate system.

Figure 1:
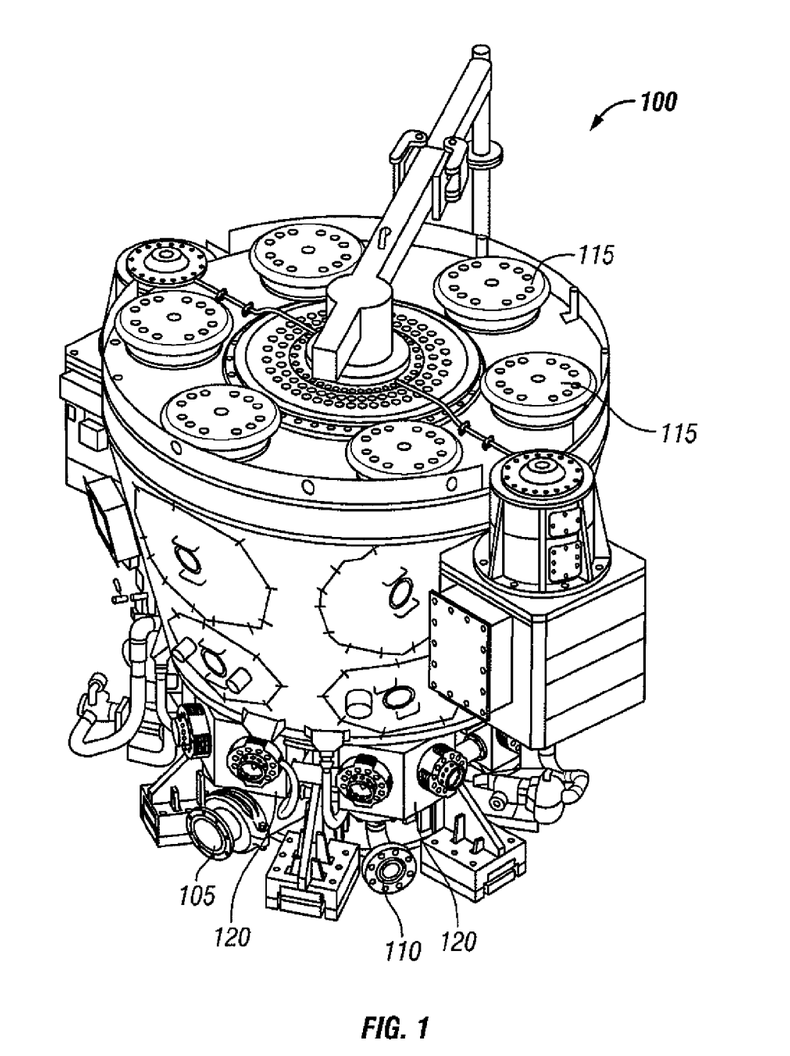
FIG. 1 is a perspective view of a pump including a plurality of valves in accordance with the principles disclosed herein.

Referring now to FIG. 1, there is shown a pump 100 including a plurality of valves in accordance with the principles disclosed herein. The pump 100 is operable to pressurize a working fluid, such as but not limited to drilling mud, to a desired pressure. The working fluid is drawn from a suction manifold (not shown) through a pump inlet 105 into the pump 100, pressurized by the pump 100, and discharged from the pump 100 through a pump outlet 110 into a discharge manifold (not shown).

In the illustrated embodiment, the pump 100 is a hex pump, having six piston-cylinder assemblies 115 driven by a common axial cam (not shown). Each piston-cylinder assembly 115 is coupled to a valve block 120. Further, each piston-cylinder assembly 115 includes a piston movably disposed within a cylinder and coupled to the axial cam. During operation of the pump 100, the axial cam rotates, causing the pistons to translate, or reciprocate, within their respective cylinders.

Figure 2A:
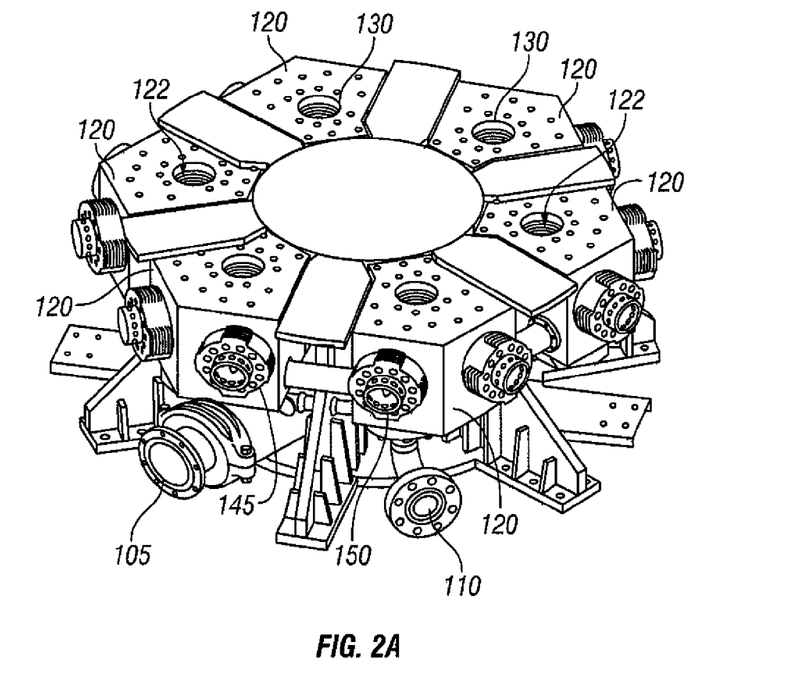
FIGS. 2A and 2B are perspective views of the pump of FIG. 1 in the absence of the piston-cylinder assemblies, illustrating the valve blocks.
Figure 2B:
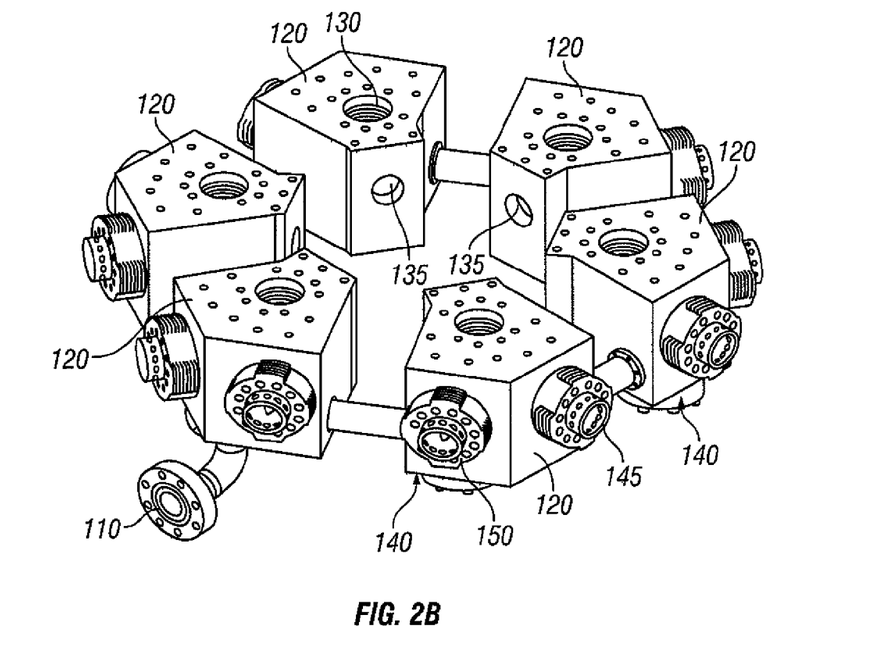

Turning to FIGS. 2A and 2B, which depict the pump 100 in the absence of the piston-cylinder assemblies 115, each valve block 120 has an internal cavity 122. The valve block 120 also has a cylinder port 130 in fluid communication with the cylinder of the associated piston-cylinder assembly 115, a suction port 135 in fluid communication with the pump inlet 105, and a discharge port 140, located on the base of the valve block 120, in fluid communication with the pump outlet 110. The cylinder port 130, suction port 135, and discharge port 140 are in fluid communication with the internal cavity 122.

Figure 3:
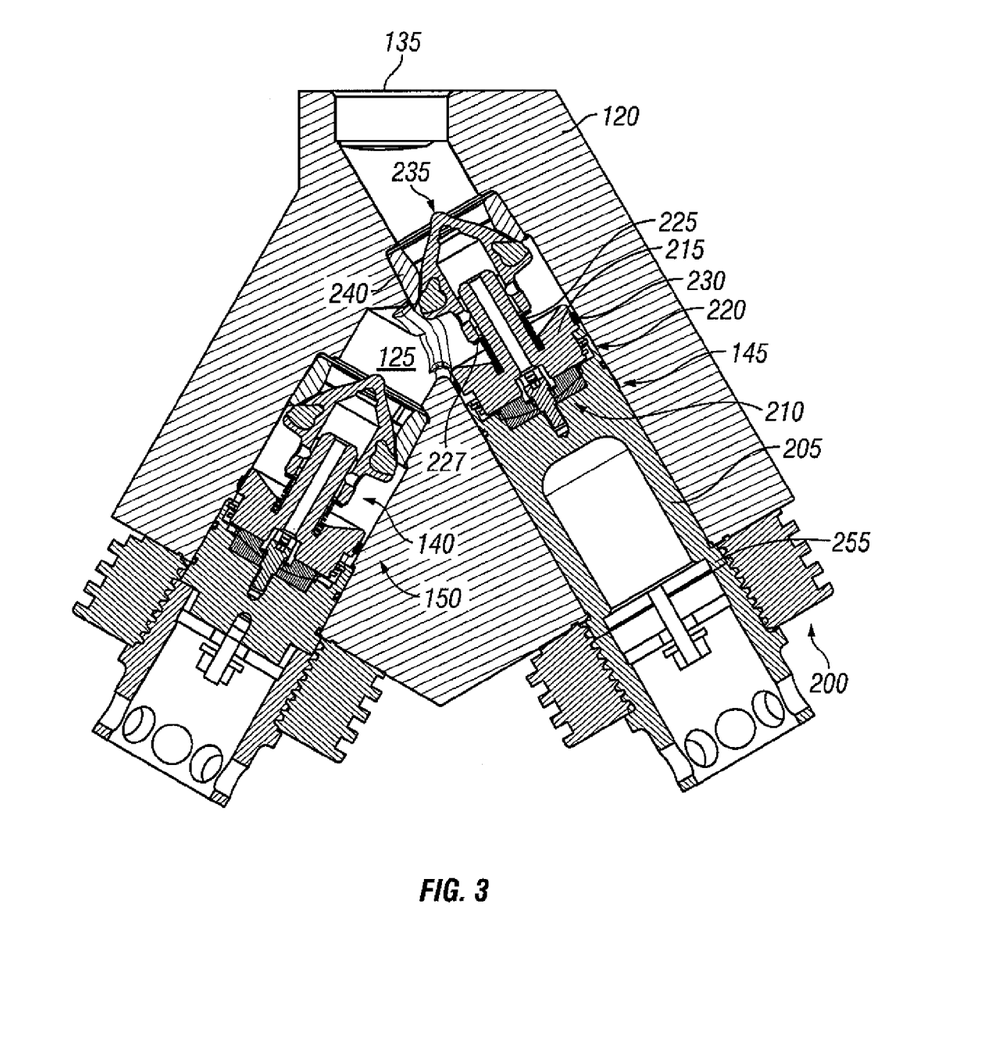
FIG. 3 is a cross-sectional view of a valve block, illustrating the suction and discharge valve assemblies disposed therein.

The pump 100 further includes a suction valve assembly 145 and a discharge valve assembly 150 disposed within the internal cavity 122 of each valve block 120. The region of the internal cavity 122 disposed between the suction valve assembly 145, the discharge valve assembly 150, and the cylinder defines a pumping chamber 125 (FIG. 3). The suction valve assembly 145 is operable to control the flow of working fluid from the pump inlet 105 into the pumping chamber 125. The discharge valve assembly 150 is operable to control the flow of pressurized working fluid from the pumping chamber 125 to the pump outlet 110.

FIG. 3 depicts a cross-section of one valve block 120, bisecting the suction valve assembly 145 and the discharge valve assembly 150 disposed therein along their axial centerlines. As previously described, the suction valve assembly 145 is disposed within the valve block internal cavity 122 to control the flow of working fluid from the pump inlet 105 through the suction port 135 of the valve block 120 into the pumping chamber 125. The discharge valve assembly 150 is disposed within valve block internal cavity 122 to control the flow of pressurized working fluid from the pumping chamber 125 through the discharge port 140 (located behind the discharge valve assembly 150 in this view) of the valve block 120 to the pump outlet 110. In the illustrated embodiment, the suction valve assembly 145 and the discharge valve assembly 150 are substantially identical, both in structure and in operation. In the interest of brevity, only the suction valve assembly 145 will be described in detail. However, its description is also applicable to the discharge valve assembly 150.

The suction valve assembly 145 includes a valve cover assembly 200, a retainer 205, a poppet guide pivot system 210, a poppet guide 215, a snap ring assembly 220, a poppet spring 225, a washer 227, a tolerance ring 230, a poppet 235, and a valve seat 240. As its name implies, the retainer 205 retains the remaining components of the suction valve assembly 145 except the valve cover assembly 200 within the valve block internal cavity 122. The retainer 205 has an enlarged outer end 255, defined relative to the outer surface of the valve block 120, that shoulders against the outer surface of the valve block 120 to limit the position of the retainer 205 relative to the valve block 120. The valve cover assembly 200 is coupled to the end 255 of the retainer 205.

Figure 4:
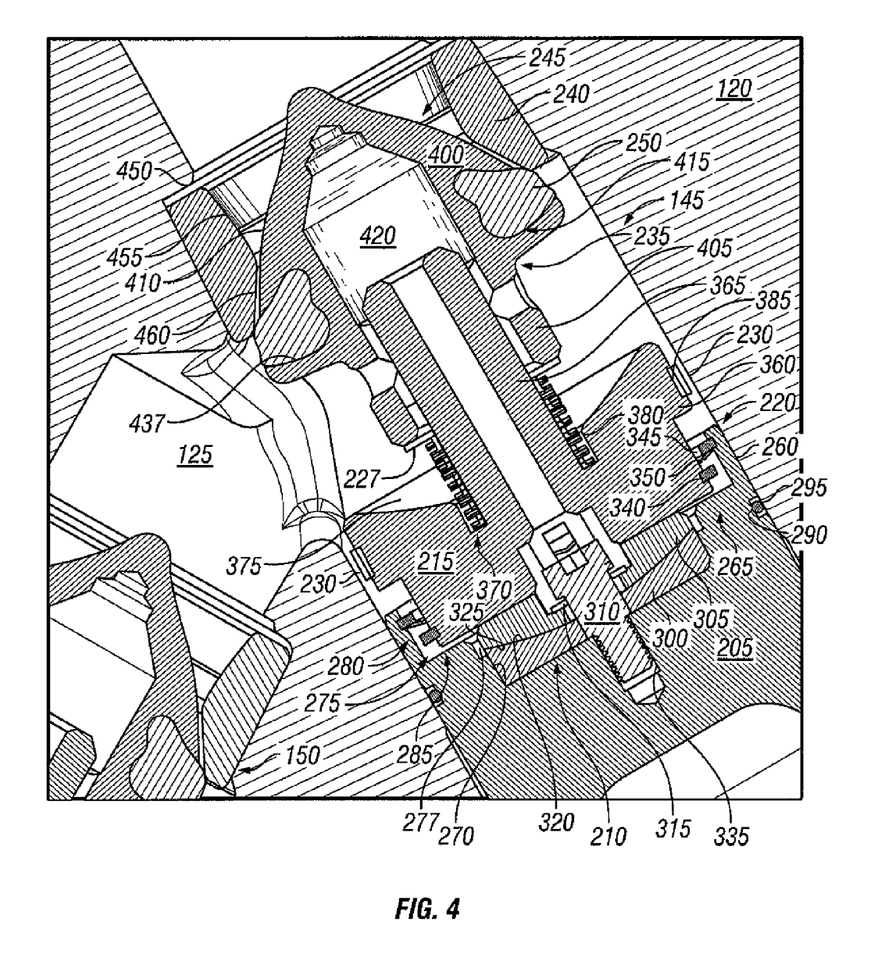
FIG. 4 is an enlarged axial cross-sectional view of the suction valve assembly of FIG. 3.

Referring next to FIG. 4, which is an enlarged view of the suction valve assembly 145, the inner end 260 of the retainer 205 includes a telescoping recess 265 having a diameter that varies with its depth. The deepest portion 270 of the recess 265 has a diameter adapted to receive the poppet guide pivot system 210 with negligible radial clearance therebetween, as shown. The shallowest portion 275 of the recess 265 has a diameter adapted to receive the poppet guide 215, leaving both radial clearance 280 and axial clearance 285 between the poppet guide 215 and the retainer 205. As will be described below, clearances 280, 285 enable limited pivotal movement of the poppet guide 215 relative to the retainer 205. The intermediate portion 277 of the recess 265 has a diameter adapted to provide radial clearance between the poppet guide pivot system 210.

To prevent the loss of working fluid from the pumping chamber 125, the retainer 205 further includes one or more annular grooves 290 formed in its outer surface and a sealing member 295 seated in each. In some embodiments, the sealing member 295 is an O-ring. The sealing members 295 sealingly engage the interior surface of the valve block 120 bounding the pumping chamber 125 to limit or prevent working fluid from passing between the suction valve assembly 145 and the valve block 120.

The poppet guide pivot system 210 enables pivoting of the poppet guide 215 relative to the axial centerline of the retainer 205. In the illustrated embodiment shown in FIG. 4, the poppet guide pivot system 210 is seated in the retainer recess 265. The poppet guide pivot system 210 includes an outer ring 300, an inner ring 305, a threaded bolt 310, and a wave spring 315. The outer ring 300 is seated within the retainer recess portion 270. The inner ring 305 is disposed within retainer recess portion 277 adjacent to and engaging the outer ring 300. There is negligible radial clearance between the outer ring 300 and the retainer 205. Hence, the outer ring 300 is prevented from appreciable radial movement relative to the retainer 205. No portion of the inner ring 305 is received within retainer recess 270. Thus, radial and/or azimuthal movement of the inner ring 305 is not limited by the retainer shoulder surrounding recess portion 270. The outer ring 300 includes a concave surface 320 abutting the inner ring 305. The inner ring 305 includes a convex surface 325 abutting the outer ring 300. These surfaces 320, 325 have mirrored curvatures that enable the inner ring 305 to move relative to the outer ring 300. Moreover, radial clearance between the retainer 205 and the inner ring 305 enables movement of the inner ring 305 relative to the outer ring 300.

The wave spring 315 is disposed about the bolt 310 between the head of the bolt 310 and the inner ring 305. The bolt 310 is threaded into a bore 335 in the retainer 205 to secure the poppet guide pivot system 210 to the retainer 205. When installed as shown, the wave spring 315 expands to maintain the outer and inner rings 300, 305 in engagement. Consequently, the inner ring 305 is moveable or slideable against the outer ring 300.

In an alternative embodiment, the poppet guide pivot system 210 may include an elastic ring (not shown) disposed between the retainer 205 and the poppet guide 215. The elastic ring is compressible under load and expandable when the load is reduced or removed. Localized compression and expansion of the ring enables the poppet guide 215 to pivot about the axial centerline of the retainer 205.

The snap ring assembly 220 is disposed between the poppet guide 215 and the retainer 205, and maintains the poppet guide 215 in engagement with the poppet guide pivot system 210. The snap ring assembly 220 includes an outer snap ring 340 connected to the poppet guide 215, an inner snap ring 345 connected to the retainer 205, and a spring 350 disposed therebetween. The spring 350 is axially compressible and expandable against the snap rings 340, 345. Expansion of the spring 350 against the outer snap ring 340 causes the poppet guide 215 to remain engaged with the inner ring 305.

As described above, the inner ring 305 of the poppet guide pivot system 210 is movable against the outer ring 300, and the poppet guide 215 is seated against the inner ring 305. The ability of the inner ring 305 to move relative to the outer ring 300 and clearances 280, 285 between the poppet guide 215 and the retainer 205 enable the poppet guide 215 to pivot about the retainer axial centerline. Depending on its direction of pivot, the spring 350 experiences localized compression in some regions between the snap rings 340, 345 and localized expansion in other regions between the snap rings 340, 345. Subsequent movement of the poppet guide 215 again causes the spring 350 to experience localized compression and expansion to allow the poppet guide 215 to pivot as needed. Thus, the snap ring assembly 220 enables an elastic coupling between the poppet guide 215 and retainer 205.

The poppet guide 215 includes a guide base 360 and a stem 365 extending axially therefrom. The guide base 360 is seated against the inner ring 305 of the poppet guide pivot system 210. The stem 365 is received within the poppet 235 with negligible radial clearance therebetween and aligns the poppet 235 such that the axial centerline of the poppet 235 aligns with the axial centerline of the stem 365. When the poppet 235 pivots relative to the axial centerline of the valve seat 240, for instance in response to contact with the valve seat 240, the poppet guide 215 pivots similarly due to engagement between the stem 365 and the poppet 235.

The guide base 360 includes an annular recess 370 about the base of the stem 365 and a concave surface 375 extending therefrom. The curvature of the concave surface 375 enables working fluid bypassing the poppet 235 to be directed toward the discharge valve assembly 150 in a manner that minimizes the creation of turbulence within the fluid. (The corresponding surface 375 on the discharge valve assembly 150 directs pressurized working fluid toward the discharge outlet 140 of the valve block 120.)

The annular recess 370 receives an end of the poppet spring 225. A shoulder 380 of the guide base 340 bounding the annular recess 370 retains the end of the spring 225 proximate the stem 365. The opposing end of the poppet spring 225 abuts an annular washer 227 seated against the poppet 235. The poppet spring 225 is expandable and compressible between the guide base 360 and the washer 227 and therefore between the poppet guide 215 and the poppet 235. Expansion and compression of the poppet spring 225 enables axial movement of the poppet 235 relative to the poppet guide 215. Further, the poppet spring 225 biases the poppet 235 to the seated position against the valve seat 240. When the force exerted on the poppet 235 by working fluid upstream of the suction valve assembly 145 exceeds the force exerted on the poppet 235 by the poppet spring 225 and working fluid in the pumping chamber 125, the poppet 235 moves axially toward the poppet guide 215, compressing the spring 225. Conversely, when the force exerted on the poppet 235 by working fluid upstream of the suction valve assembly 145 is less than the force exerted on the poppet 235 by the poppet spring 225 and working fluid in the pumping chamber 125, the poppet 235 moves axially away from the poppet guide 215, allowing the spring 225 to expand.

The guide base 340 further includes an annular groove 385 in its outer surface, radially speaking. The tolerance ring 230 is seated within the groove 385. The tolerance ring 230 is radially compressible under load and expandable in the absence of load. When the poppet guide 215 pivots, as previously described, the tolerance ring 230 experiences localized compression, depending on the direction of pivot, due to contact with the valve block 120. When the poppet guide 215 pivots again and the localized compression loads to the tolerance ring 230 are removed, the tolerance ring 230 expands and returns to its unloaded shape. The elastic nature of the tolerance ring 230 reduces wear to the poppet guide 215 that may otherwise occur in the absence of the tolerance ring 230. Moreover, the tolerance ring 230 enables centering of the poppet guide 215 and the poppet 235 coupled thereto within the internal cavity 122 of the valve block 120.

The valve seat 240 is an annular member disposed within the valve block cavity 122 in abutment with a shoulder 450 of the valve block 120. The valve seat 240 includes a converging inner surface 455 and a diverging inner surface 460. The converging surface 455 directs working fluid from the suction port 135 of the valve block 120 toward the poppet 235. The diverging surface 460 promotes the flow of the working fluid around the poppet 235 when the poppet 235 is unseated, meaning disengaged from the valve seat 240. The diverging surface 460 is also that portion of the valve seat 240 that engages the poppet 235 when the poppet 235 is seated, or engaged with the valve seat 240. Consequently, the diverging surface 460 is shaped to promote effective sealing with the poppet 235.

Figure 5:
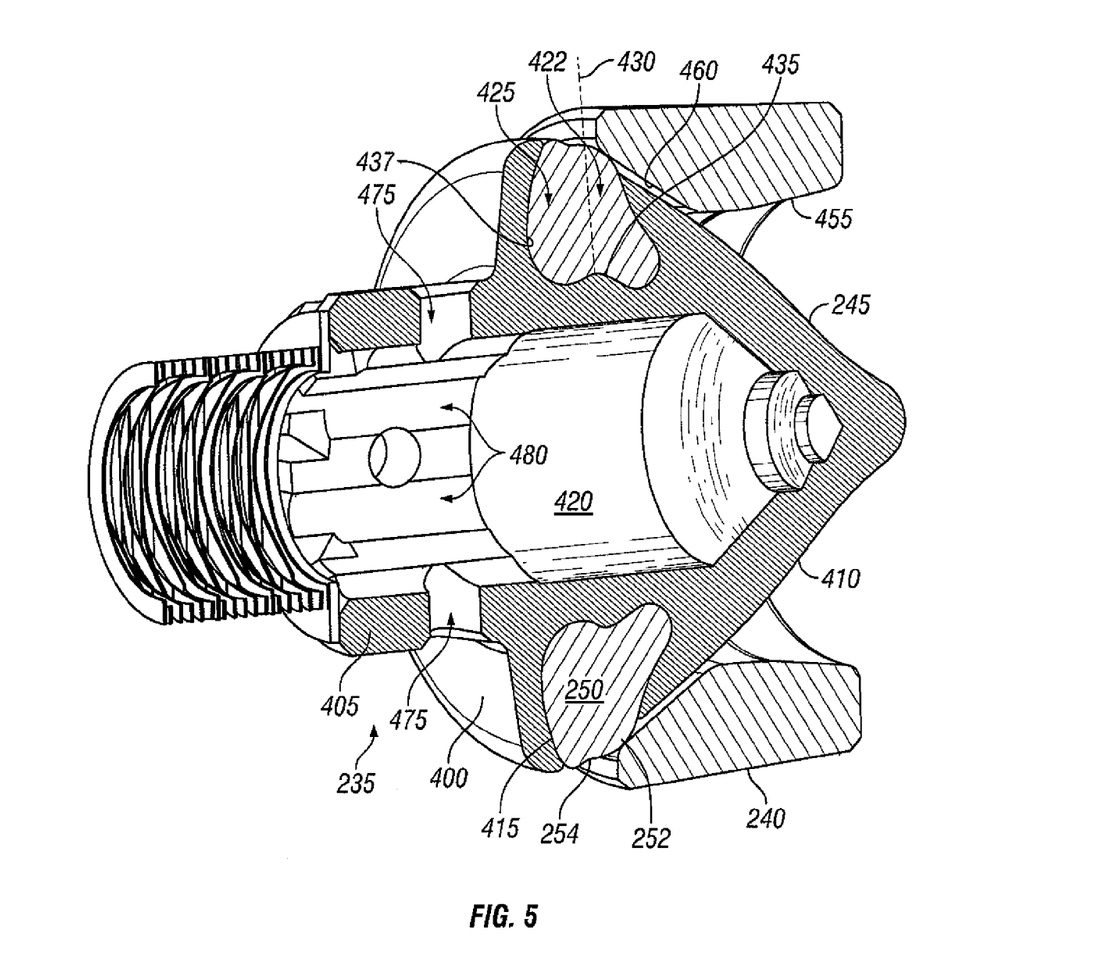
FIG. 5 is a perspective axial cross-sectional view of the poppet and valve seat of FIG. 4.

As best viewed in FIG. 5, the poppet 235 includes a poppet body 245 with a seal 250 disposed thereabout. In some embodiments, the poppet body 245 comprises at least one of heat treated steel and heat treated stainless steel. The poppet body 245 has a hollow head 400 and a tubular stem 405 extending therefrom. The hollow head 400 enables a reduced wall thickness of the poppet body 245. The reduced wall thickness, in turn, enables the poppet body 245 to be flexible and respond elastically to impacts with the valve seat 240. This reduces wear to both the poppet 235 and the valve seat 240 that would otherwise occur if the poppet 235 were more rigid, as is the case for many conventional poppet valves. Consequently, the flexible nature of the poppet body 245 promotes increased services lives for the poppet 235 and the valve seat 240. Further, the head 400 has a somewhat conically-shaped outer surface 410 and a seal groove 415 formed therein. The outer surface 410 is shaped to promote effective sealing with the valve seat 240 and to enable smooth fluid flow around the poppet 235 when unseated with minimal turbulence creation. In the exemplary embodiment shown in FIG. 5, the diverging surface 460 of valve seat 240, as well as the portion of outer surface 410 of head 400 that comes into engagement with surface 460, is substantially planar when viewed in cross-section. However, these surfaces 410, 460 may be curved in other embodiments.

The groove 415 receives the seal 250 therein. The surface of the poppet head 400 bounding the groove 415 forms a protrusion 435 that extends radially into the groove 415 and has a curved "bowl-shaped" or concave portion 437. The groove 415 has an inner portion 422 and an outer portion 425 defined by a radial plane 430 that substantially bisects the protrusion 435. For reasons described below, the groove 415 is sized such that the outer portion 425 has a volume exceeding that of the inner portion 422. In some embodiments, the volume of the outer portion 425 is 4% greater than that of the inner portion 422.

The seal 250 comprises a flexible resilient or elastic material, such as but not limited to polyurethane and/or rubber. The dimensions of the seal 250 are selected such that when the poppet 235 displaces toward the valve seat 240, such as to close the suction valve assembly 145, the seal 250 contacts the valve seat 240 before any portion of the poppet body 245. In the exemplary embodiment, the seal 250 has a radially extending protrusion, or bulge, 252 adjacent a reduced diameter, or recessed, portion 254. The bulge 252, which extends radially beyond the poppet head 400, is the portion of the seal 250 that makes the initial contact with the valve seat 240, as shown. Initial contact by the seal 250 with the valve seat 240 enables the seal 250 to compress to a degree and movement of the poppet 235 to be slowed before the poppet head 400 engages the valve seat 240, both of which comprise material that is more rigid than that of the seal 250. Slowing the poppet 235 in this manner before the poppet head 400 engages the valve seat 240 reduces the impact force between the valve seat 240 and the poppet head 400. This, in turn, reduces wear to these components 240, 400 and enables them to have longer service lives.

Continued movement of the poppet 235 against the valve seat 240 causes the seal 250 to further compress within the groove 415. Compression of the seal 250 is promoted by the shape of the seal 250, in particular the reduced diameter portion 254, and the seal groove 415. As previously described, the outer portion 425 of the groove 415 has a volume exceeding that of the inner portion 422. As the poppet 235 moves against the valve seat 240, localized compression of the seal 250 occurs proximate the valve seat 240. The material of the seal 250 behaves like a very viscous fluid when exposed to high pressure. Consequently, when the seal 250 experiences localized compression due to contact with the valve seat 240, some seal material in the inner portion 422 flows into the larger outer portion 425. In contrast, conventional seal grooves cannot accommodate this shifting of seal material under compression. As a result, the seal material, with nowhere to move, stretches, rather than compresses, and overtime experiences fatigue damage. The "bowl-shaped" or concave curvature of the portion 437 of the poppet head surface bounding the seal groove 415 further promotes compression of the seal 250 by directing the seal material into the interior of the seal groove 415.

During manufacturing of the poppet 235, a lubricant may be applied to a portion of the surface of the poppet body 245 bounding the seal groove 415, such as but not limited to the protrusion 435. The elastic seal material is then poured into the seal groove 415. After solidification of the seal material, the seal 250 adheres to the surface of the poppet body 245 except over the lubricated protrusion 435. Thus, the seal 250 is unattached to the protrusion 435 of the poppet body 245. When the seal 250 engages the valve seat 240 during operation of the suction valve assembly 145, the seal 250 bends and compresses around the protrusion 435, but does not pull and stretch due to attachment with the protrusion 435.

The poppet stem 405 receives the poppet guide stem 365 therein, defining an internal cavity 420 between the poppet guide stem 365 and the inner surface of the poppet 235. The poppet stem 405 has one or more radial ports 475 extending therethrough. Additionally, the poppet stem 405 has one or more axial channels 480 along its inner surface. The radial ports 475 and axial channels 480 enable fluid communication between the pumping chamber 125 (FIG. 4) and the internal cavity 420. When the poppet 235 moves axially toward the valve seat 240 relative to the poppet guide stem 365 (FIG. 4), working fluid flows freely from the pumping chamber 125 through radial ports 475 and axial channels 480 into the internal cavity 420. Conversely, when the poppet 235 moves axially in the opposite direction, some working fluid in the internal cavity 420 is displaced by the poppet guide stem 365. The displaced working fluid flows freely from the internal cavity 420 through the axial channels 480 and radial ports 475 into the pumping chamber 125.

The rate of fluid flow into or out of the internal cavity 420 of the poppet 235 is dependent upon the number and cross-sectional size of the radial ports 475 and axial channels 480. The speed at which the poppet 235 responds to pressure difference, as previously described, and moves relative to the poppet guide 215 is, in turn, dependent upon the rate of fluid into or out of the internal cavity 420. The greater the number and/or the larger the size of ports 475 and channels 480, the quicker the poppet 235 responds and moves. Conversely, the fewer the number and/or the smaller then size of ports 475 and channels 480, the slower the poppet 235 responds and moves. In other words, movement of the poppet 235 is dampened. For this reason, the suction valve assembly 145 may be described as having an integrated dampener. In preferred embodiments, the number and cross-sectional size of the ports 475 and channels 480 are selected to dampen movement of the poppet 235 sufficiently to minimize the creation of pulsations in the working fluid due to poppet movement. At the same time, the number and size of the ports 475 and channels 480 are selected such that the ports 475 and channels 480 do not impede or restrict fluid flow to a degree that causes the working fluid to flow toward the suction module. (In the discharge valve assembly 150, the number and size of the ports 475 and channels 480 are selected such that the ports 475 and channels 480 do not impede or restrict fluid flow to a degree that causes the working fluid to flow toward the suction module.)

During operation of the pump 100, the pistons reciprocate within their respective cylinders. As each piston strokes back, a vacuum is drawn on the pumping chamber 125 (FIG. 3) of the valve block 120 to which the piston is coupled. Due to the pressure differential between the pumping chamber 125 and working fluid downstream of the discharge valve assembly 150, the discharge poppet 235 moves axially along the guide poppet 215 toward the valve seat 240. Movement of the discharge poppet 235 causes working fluid to be drawn through radial ports 475 and axial channels 480 of the discharge poppet 235 into its internal cavity 420. Due to the size and number of ports 475 and channels 480, the rate at which fluid flows into the internal cavity 420 is controlled, dampening movement of the poppet 235 in response to fluid passing over the poppet 235 and reducing the tendency for the poppet 235 to shiver as it approaches the valve seat 240. When the discharge poppet 235 is proximate the valve seat 240, the seal 250 engages the valve seat 240, compressing and slowing movement of the poppet 235. Continued movement of the poppet 235 toward the valve seat 240 further compresses the seal 250, causing some seal material to flow from the inner portion 422 of the seal groove 415 into the outer portion 425, until the discharge poppet 235 is seated against the valve seat 240. The combination of the shape of the valve seat surface 460, engagement between the discharge poppet stem 405 and the discharge poppet guide stem 365, and the ability of the discharge poppet guide 215 to pivot, as previously described, enable centering of the discharge poppet 235 against the valve seat 240 to form a complete seal therebetween. In this manner, the discharge valve assembly 150 is closed.

Likewise, due to the pressure differential between the pumping chamber 125 (FIG. 4) and fluid upstream of the suction valve assembly 145, the suction poppet 235 moves axially along the poppet guide 215 away from the valve seat 240. In response, some working fluid within the internal cavity 420 of the suction poppet 235 is displaced from the internal cavity 420 through the axial channels 480 and radial ports 475 into the pumping chamber 125. Due to the size and number of ports 475 and channels 480, the rate at which fluid flows out of the internal cavity 420 is controlled, dampening movement of the poppet 235 in response to fluid passing over the poppet 235 and reducing the tendency for the poppet 235 to shiver as it moves away from the valve seat 240. Also, as the suction poppet 235 unseats, the seal 250 expands, returning to its uncompressed shape within the seal groove 415. In this manner, the suction valve assembly 145 is opened.

With the discharge valve assembly 150 closed and the suction valve assembly 145 open, working fluid passes from the suction manifold through the pump inlet 105 and the suction port 135 of the valve block 120 around the unseated suction poppet 235 to fill the pumping chamber 125, including the cylinder. Some of the working fluid passing around the poppet 235 contacts the poppet guide base 360. Due to the curved shape of the poppet guide surface 375 (FIG. 4), the working fluid is directed toward the discharge valve assembly 150 with minimal turbulence creation.

When the piston reaches the end of its stroke, the piston reverses direction and begins to stroke forward. As the piston strokes forward, fluid pressure in the cylinder and the pumping chamber increases. When the force exerted on the suction poppet 235 by fluid in the pumping chamber 125 and the suction poppet spring 225 exceeds the force exerted on the suction poppet 235 by fluid upstream of the poppet 235, the suction valve assembly 145 closes in an identical manner as that described above in regards to closing of the discharge valve assembly 150. After the suction valve assembly 145 is closed, the pumping chamber 125 ceases to receive working fluid from the suction manifold.

When the force exerted on the discharge poppet 235 by fluid in the pumping chamber 125 exceeds the force exerted on the discharge poppet 235 by fluid downstream of the poppet 235 and the discharge poppet spring 225, the discharge valve assembly 150 opens in an identical manner as that described above in regards to opening of the suction valve assembly 145. After the discharge valve assembly 150 is open, pressurized fluid in the pumping chamber 125 flows around the discharge poppet 235 through the discharge port 140 of the valve block 120 and the pump outlet 110 into the discharge manifold. Some of the working fluid passing around the discharge poppet 235 contacts the poppet guide base 360. Due to the curved shape of the poppet guide surface 375, the working fluid is directed toward the discharge port 140 with minimal turbulence creation. When the piston reaches the end of its stroke, it again reverses direction, and begins to stroke out, drawing a vacuum on the pumping chamber 125 and so on, as described above. While the pump 100 continues to operate, this process repeats, and pressurized working fluid is exhausted from the pump outlet 110.

Valve assemblies 145, 150 with integrated dampeners have been described. In the exemplary embodiments, the valve assembly has the internal cavity 420 that receives and exhausts fluid. The rate at which the fluid enters or leaves the internal cavity 420 dampens movement of the poppet 235 in response to fluid passing over the poppet 235 and reduces the tendency for the poppet 235 to shiver. The poppet 235 has the seal 250 which, during closing of the valve assembly, contacts the valve seat 240 before any portion of the poppet head 400. Subsequent compression of the seal 250 slows movement of the poppet 235 and reduces impact forces between the poppet head 400 and the valve seat 240. This, in turn, reduces wear to these components 240, 400, enabling them to have longer service lives. The poppet 235 also has the seal groove 415 which is shaped to enable compression, rather than stretching, of the seal 250 during contact with the valve seat 240. This prevents fatigue damage to the seal 250. The valve assembly poppet guide 215 is pivotable. This promotes centering of the poppet 235 against the valve seat 240, which enables effective sealing between these components and complete closure of the valve assembly. The curved shape of the poppet guide base 340 directs the flow of working fluid through the valve assembly with minimal turbulence creation that would otherwise generate pulsations in the fluid.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A valve assembly comprising:
   a poppet guide having a stem;
   a hollow poppet receiving the poppet guide stem therein, wherein the poppet and the poppet guide define an internal cavity;
   a retainer having a recess within which the poppet guide is received;
   a first snap ring disposed between the poppet guide and the retainer, the first snap ring coupled to the retainer;
   a second snap ring disposed between the poppet guide and the retainer, the second snap ring coupled to the poppet guide; and
   a spring disposed between the first snap ring and the second snap ring;
   wherein the poppet is movable relative to the poppet guide to adjust the volume of the internal cavity.

2. A valve assembly comprising:
   a poppet guide;
   a poppet guide pivot system engaging the poppet guide and having an axial centerline, the poppet guide pivot system enabling pivoting of the poppet guide relative to the axial centerline;
   a poppet receiving an end of the poppet guide therein, wherein the poppet is pivotable with the poppet guide; and
   a retainer element;
   wherein the poppet guide pivot system comprises:
      a first ring having a first surface engaging the poppet guide and a second, convex surface opposite the first surface and intersected by the axial centerline;
      a second ring having a concave surface intersected by the axial centerline and engaging the convex surface of the first ring and having an opposite surface engaging the retainer; and
      a fastener disposed through the first and second ring and coupling the first and second ring to the retainer, the fastener adapted to allow the convex surface of the first ring to slide radially relative to the concave surface of the second ring.

3. The valve assembly of claim 2, wherein the poppet guide is pivotable relative to the axial centerline with movement of the first ring.

4. The valve assembly of claim 3 wherein the fastener comprises a head portion and wherein the valve assembly further comprises:
   a spring disposed between the head portion and the first ring, the spring biasing the first ring into engagement with the second ring 5. The valve assembly of claim 2, further comprising a retainer with a recess into which the poppet guide extends, wherein there is clearance between the retainer and the poppet guide enabling pivotable movement of the poppet guide relative to the axial centerline.

6. The valve assembly of claim 5, further comprising:
   a first snap ring disposed between the poppet guide and the retainer, the first snap ring coupled to the retainer;
   a second snap ring disposed between the poppet guide and the retainer, the second snap ring coupled to the poppet guide; and
   a spring disposed between the first snap ring and the second snap ring.

7. The valve assembly of claim 2, further comprising a retainer with a telescoping recess in which the first ring and the second ring are seated, wherein the first ring is prevented from moving radially relative to the retainer and wherein radial clearance between the retainer and the second ring enables radial movement of the second ring relative to the retainer.

8. The valve of claim 2, further comprising an elastic tolerance ring disposed about the poppet guide, the tolerance ring being compressible under load and expandable when the load is reduced.

9. The valve assembly of claim 2, wherein the poppet guide pivot system comprises an elastic pivot ring against which the poppet guide is seated, the pivot ring being locally compressible and expandable to enable pivoting of the poppet guide about the axial centerline.

10. The valve assembly of claim 2, wherein first and second rings have apertures; and
    wherein aperture of first ring is larger than the aperture of second ring.

11. The valve assembly of claim 2, wherein the poppet guide and first ring are configured such that pivoting of poppet guide relative to the axial centerline causes the convex surface of the first ring to slide radially relative to the concave surface of the second ring.

12. A valve assembly comprising:
    a poppet guide having a base and a stem extending therefrom; and
    a hollow poppet receiving the poppet guide stem therein, wherein the poppet and the poppet guide define an internal cavity;
    a first ring;
    a second ring engaging the first ring; and
    a bolt extending through the first ring and the second ring, the bolt having a head; and
    a spring disposed between the bolt head and the first ring, the spring biasing the first ring into engagement with the second ring;
    wherein the poppet is movable relative to the poppet guide to adjust the volume of the internal cavity, the poppet further comprising:
       a generally conical poppet body having an outer surface;
       an annular seal groove in the poppet body; and
       an elastic annular seal disposed within the seal groove, the seal comprising a radially extending annular protrusion that extends beyond the outer surface of the poppet body, and an annular recess adjacent the radially extending annular protrusion
    wherein the base of the poppet guide is seated against the first ring.

13. The valve assembly of claim 12, wherein the poppet body further comprises a hollow head and a tubular stem extending therefrom and wherein the poppet stem receives the poppet guide stem therein.

14. The valve assembly of claim 13, wherein the poppet stem has a radial port extending therethrough and an axial channel formed along an interior surface of the tubular stem, the axial channel providing fluid communication between the internal cavity and the radial port.

15. The valve assembly of claim 12, further comprising a spring disposed between the poppet and the poppet guide, the spring biasing the poppet in a direction away from the poppet guide.

16. The valve assembly of claim 12, wherein the poppet guide stem has an axial flowbore extending therethrough, the axial flowbore in fluid communication with the internal cavity.

17. The valve assembly of claim 12, further comprising:
a retainer having a telescoping recess; and
a ring disposed between the retainer and the poppet guide;
wherein the telescoping recess comprises a first recess portion in which the ring is seated and a second recess portion within which the poppet guide is received.

18. The valve assembly of claim 12, further comprising a tolerance ring disposed about the poppet guide, the tolerance ring being compressible under load and expandable when the load is reduced.

19. The valve assembly of claim 12, wherein the poppet guide further comprises a base from which the poppet stem extends, the base comprising a concave surface.

20. A valve assembly comprising: a poppet guide having a base and a stem extending therefrom generally along an axial centerline;
a poppet receiving the poppet guide stem therein, wherein the poppet and the poppet guide define an internal cavity;
a first ring having a first surface engaging the base of the poppet guide and a second, convex surface opposite the first surface and intersected by the axial centerline; and
a second ring having a concave surface intersected by the axial centerline and engaging the convex surface of the first ring;
wherein the poppet is movable along the poppet guide stem to adjust the volume of the internal cavity; and
wherein the first and second rings are configured to allow the convex surface of the first ring to slide radially relative to the concave surface of the second ring.

21. The valve assembly of claim 20 further comprising:
a retainer; and
a fastener disposed through a first aperture in the first ring and through a second aperture in the second ring and coupling the first and second ring to the retainer;
wherein the first aperture has a larger diameter than the second aperture.

22. The valve assembly of claim 20, wherein the poppet comprises a hollow head and a tubular stem extending therefrom and wherein the poppet stem receives the poppet guide stem within the tubular stem; and
wherein the tubular stem has a radial port extending therethrough and an axial channel disposed adjacent the poppet guide stem, the axial channel providing fluid communication between the internal cavity and the radial port.

23. The valve assembly of claim 20 further comprising:
a retainer having a recess within which the poppet guide is received;
a first snap ring disposed between the poppet guide and the retainer, the first snap ring coupled to the retainer;
a second snap ring disposed between the poppet guide and the retainer, the second snap ring coupled to the poppet guide; and
a spring disposed between the first snap ring and the second snap ring.

24. The valve assembly of claim 20, wherein the base of the poppet guide has a substantially planar surface that engages the first surface of the first ring.

* * * * *